United States Patent [19]

Rosen

[11] Patent Number: 4,741,502
[45] Date of Patent: May 3, 1988

[54] METHOD AND APPARATUS FOR LAUNCHING A SPACECRAFT BY USE OF A RECOVERABLE UPPER ROCKET STAGE

[75] Inventor: Harold A. Rosen, Santa Monica, Calif.

[73] Assignee: Hughes Aircraft Company, Los Angeles, Calif.

[21] Appl. No.: 914,103

[22] Filed: Oct. 1, 1986

Related U.S. Application Data

[63] Continuation-in-part of Ser. No. 782,746, Oct. 1, 1985.

[51] Int. Cl.⁴ .............................................. B64G 1/10
[52] U.S. Cl. .................... 244/172; 244/158 R
[58] Field of Search ............... 244/158 R, 172, 160, 244/162, 161

[56] References Cited

U.S. PATENT DOCUMENTS

| 3,369,771 | 2/1968 | Walley et al. | 244/162 |
| 4,471,926 | 9/1984 | Steel, III | 244/172 |
| 4,609,169 | 9/1986 | Schweickert et al. | 244/172 |

FOREIGN PATENT DOCUMENTS

| 2051246 | 1/1981 | United Kingdom | 244/172 |

OTHER PUBLICATIONS

T. A. Heppenheimer, "Paving the Way for Space Tugs", *High Technology*, Sep. 1985, pp. 57–59.

*Primary Examiner*—Jeffrey V. Nase
*Assistant Examiner*—Rodney Corl
*Attorney, Agent, or Firm*—S. M. Mitchell; M. J. Meltzer; A. W. Karambelas

[57] ABSTRACT

An apparatus and method for launching a spacecraft including a payload and a delivery stage having a rocket engine powered by fluid bipropellant from the earth into a high energy orbit and for recovering the delivery stage are disclosed. By reducing the delivery stage mass, it becomes feasible and cost effective to recover the delivery stage for reuse. Delivery stage mass is reduced by several techniques including transporting the spacecraft and the fluid bipropellant to a parking orbit with the fluid bipropellant in tanks external to the spacecraft; transferring the fluid bipropellant to light weight tanks integral to the spacecraft; controlling the relative flow rates of the fluid bipropellant constituents to the rocket engine during firing of the rocket engine to ensure complete use of both bipropellant constituents; and controlling ascent and descent maneuvers from remote tracking stations. A space shuttle can be used to transport the spacecraft and fluid bipropellant in its cargo bay to the parking orbit and recover the delivery stage at the end of a mission. The invention is particularly useful for delivery of payloads to geosynchronous orbits.

19 Claims, 12 Drawing Sheets

METHOD AND APPARATUS FOR LAUNCHING A SPACECRAFT BY USE OF A RECOVERABLE UPPER ROCKET STAGE

This application is a continuation-in-part of application Ser. No. 782,746, filed Oct. 1, 1985.

BACKGROUND OF THE INVENTION

1. Field of the Invention

The invention relates to the launch and achievement of a desired trajectory above the earth by a spacecraft and, more particularly, to a method for reducing the upper stage mass by an amount sufficient to make stage recovery for reuse feasible and cost efficient.

2. Description of the Related Art

A fundamental objective in designing and building spacecraft using engines powered by a fluid bipropellant comprising constituents such as an oxidizer and a fuel and launching the spacecraft from the earth is to make optimum use of the proportion of total mass carried aloft from the earth with the spacecraft which comprises bipropellant constituents for maneuvering the spacecraft once it has reached the relatively low gravity environment above the earth.

With the advent of the space shuttle, there has also been an impetus to construct a spacecraft with a reusable upper rocket stage which is recoverable by the space shuttle. In order to make such a reusable rocket stage truly feasible, its overall mass must be kept at a minimum by insuring complete and efficient use of the bipropellant.

For a typical geosyncharonous orbiting spacecraft powered by an engine using a fluid bipropellant, for example, the bipropellant may comprise approximately 75% of the combined weight of the spacecraft and the bipropellant. A fluid bipropellant powered spacecraft launched from the space shuttle for geosynchronous orbit about the earth ordinarily requires at least enough bipropellant to propel the spacecraft from a relatively low parking orbit about the earth to a generally elliptical transfer orbit, to propel the spacecraft from a transfer orbit to a substantially circular geosynchronous orbit and to perform station-keeping maneuvers during the operational lifetime of the spacecraft.

In the past, however, several factors have militated against the reduction of overall spacecraft mass and the efficient usage of spacecraft bipropellant. For example, enough spacecraft structure has been necessary to support the spacecraft bipropellant during the trip from the surface of the earth to the relatively low gravity environment above the earth during which high accelerational forces are experienced by the spacecraft and its bipropellant. Furthermore, enough surplus bipropellant often has been carried aloft to compensate for inaccuracies in the calculated utilization of the spacecraft bipropellant.

In earlier spacecraft launches, fluid bipropellant usually was carried aloft within tanks supported by support structure integral to the spacecraft. During launch from earth to the relatively low gravity environment above the earth, the rapid acceleration and vibration of the fluid bipropellant often resulted in loading of the bipropellant with forces equal to many times the force that the earth's gravity would exert on the bipropellant if it were at rest on the surface of the earth. Consequently, tanks containing the bipropellant and support structure supporting it had to be sturdy enough to withstand such high loading. Unfortunately, sturdier tanks and support structure generally were more massive. Thus, the tanks and support structure of earlier spacecraft had to be massive and sturdy enough to withstand the high loading of the bipropellant during the launch.

In the past, a spacecraft often was staged to reduce its overall mass after it entered the relatively low gravity environment above the earth. For example, spacecraft were built which, during the transfer orbit, staged the spacecraft motor which propelled the spacecraft from the parking orbit to the transfer orbit.

Furthermore, in the past, various techniques have been employed in order to more efficiently utilize the bipropellant in order to avoid surpluses. For example, during the firing of a rocket engine, the rate of consumption of each bipropellant constituent has been measured, and its flow rate to the rocket engine has been adjusted accordingly in order to achieve more complete consumption of both bipropellant constituents. Furthermore, in the case of some spacecraft of the type which have had large numbers of launchings, sufficient data on their rocket engine in-flight performance has been compiled to provide a relatively accurate estimate of how much of each bipropellant constituent is needed for a given mission.

While earlier techniques for efficiently utilizing fluid bipropellant generally have been successful, there have been shortcomings with their use. For example, the measurement and adjustment of a bipropellant constituent's flow rate during the firing of a rocket engine often cannot be performed with sufficient accuracy. Furthermore, when a type of spacecraft has not had the benefit of numerous launchings in which to compile bipropellant consumption rate statistics, there may be insufficient data to accurately predict the rates of consumption of the bipropellant constituents during a particular mission.

Thus, there has been a need for a method for launching a spacecraft with a recoverable rocket stage from the earth and for achieving a desired trajectory above the earth while reducing the overall mass of the spacecraft dedicated to supporting the bipropellant during the launch and while efficiently utilizing the bipropellant while the spacecraft is transported from a parking orbit to a geosynchronous orbit. The present invention meets this need.

SUMMARY OF THE INVENTION

The present invention provides a method and apparatus for launching a spacecraft including a payload and a delivery stage having a rocket engine powered by fluid bipropellant from the earth and for recovering the delivery stage. The invention comprises the steps of placing the spacecraft and the fluid bipropellant in a transport vehicle for carrying the spacecraft and the fluid bipropellant from the earth to a parking orbit above the earth. During launch from earth, the fluid bipropellant is contained in tanks external to the spacecraft. The spacecraft and the external tanks containing the fluid bipropellant are carried from the earth's surface to a parking orbit above the earth. Fluid bipropellant then is transferred from the external tanks to tanks integral to the spacecraft. Such a system for transporting the fluid bipropellant in tanks external to the spacecraft stage is described and claimed in a copending patent application, Ser. No. 707,278, filed Mar. 1, 1985 and assigned to the assignee of the present invention. The spacecraft then is deployed from the transport vehicle. The spacecraft rocket engine is actuated, and during the actuation of the rocket engine, a flow of bipropellant constituents is provided to the rocket engine in a first proportion. After the actuation of the rocket engine, the remaining mass of each bipropellant constituent is measured. A gas pressure level is adjusted within at least one integral tank relative to a pressure level within another tank based upon the remaining mass of the bipropellant constituents measured. The rocket engine is again actuated, and during the actuation of the rocket engine, a flow of bipropellant constituents to the rocket engine is provided in a second proportion based upon the aforementioned adjusted pressure level. Such a method for controlling the use of fluid bipropellant in a spacecraft rocket engine is described and claimed in the parent patent application of the present application, Ser. No. 782,746, filed Oct. 1, 1985 and assigned to the assignee of the present invention. Stage mass efficiency is further achieved by spacecraft radio guidance control from ground based stations. This control technique is used for multiple starts of the rocket engine to move the spacecraft from a parking orbit, through one or more intermediate or transfer orbits and into a geosynchronous orbit. After propelling the spacecraft into the geosynchronous orbit at apogee of the final transfer orbit, the spacecraft payload and delivery stage are separated. The delivery stage is then guided through a set of descent maneuvers, also under radio guidance control from ground based stations. The delivery stage is brought back to the parking orbit of the space shuttle and is recaptured for return to earth and reuse on later missions.

The features and advantages of the present invention will become more apparent from the following more detailed description of exemplary embodiments thereof, as illustrated in the accompanying drawings.

BRIEF DESCRIPTION OF THE DRAWINGS

The purpose and advantages of the present invention will be apparent to those skilled in the art from the following detailed description in conjunction with the appended drawings in which.

DESCRIPTION OF THE PREFERRED EMBODIMENTS

The present invention comprises a novel method for transporting a spacecraft including a rocket engine delivery stage powered by fluid bipropellant from the earth and for returning the delivery stage to the earth. The following description is presented to enable any person skilled in the art to make and use the invention, and is provided in the context of a particular application and its requirements. Various modifications to the preferred method will be readily apparent to those skilled in the art, and the generic principles defined herein may be applied to other methods and applications without departing from the spirit and scope of the invention. Thus, the present invention is not intended to be limited to the methods shown, but is to be accorded the widest scope consistent with the principles and features disclosed herein.

Figure 1:
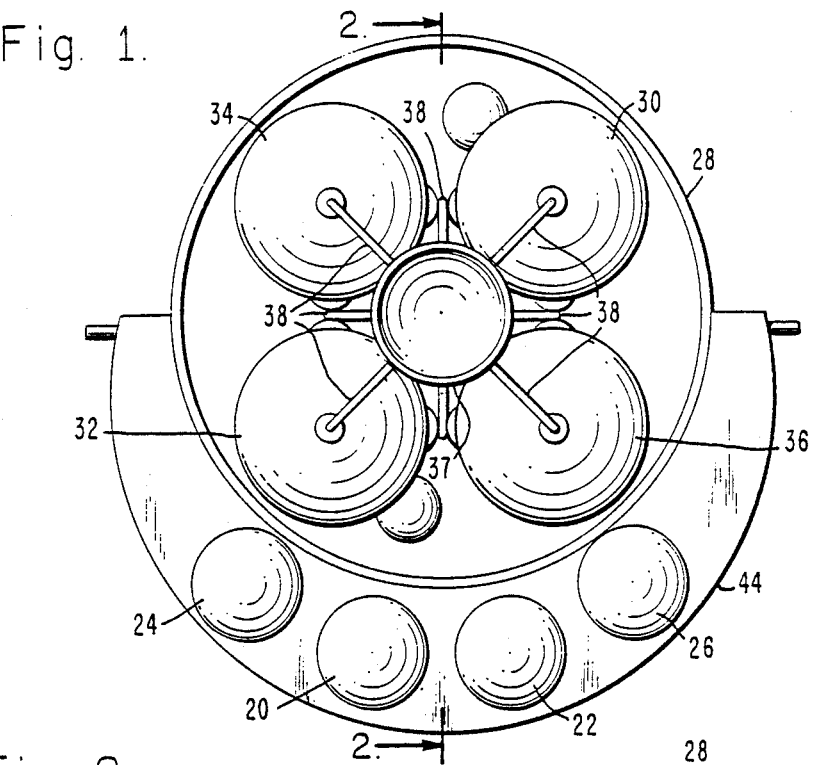
FIG. 1 is an end view of a preferred embodiment of the invention within a spacecraft and its supporting cradle.
Figure 2:
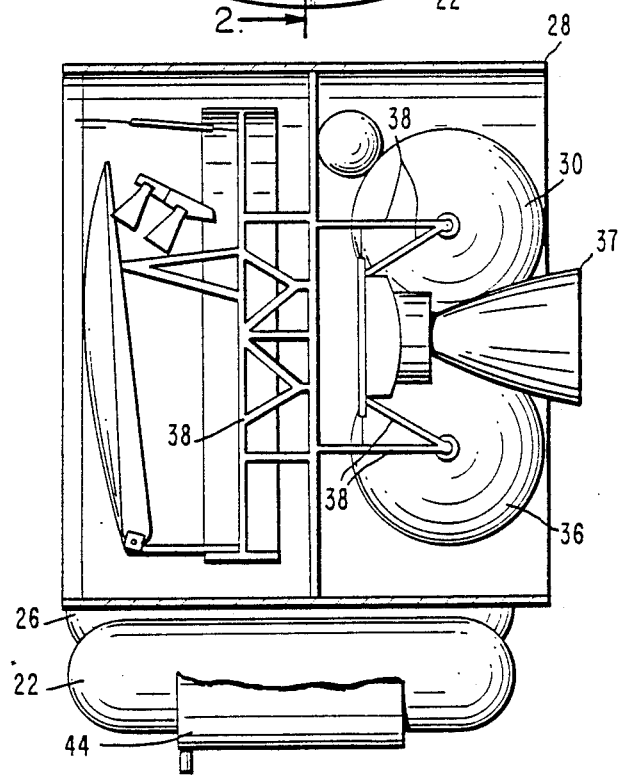
FIG. 2 is a longitudinal section view of the preferred embodiment taken along line 2—2 of FIG. 1.
Figure 3:
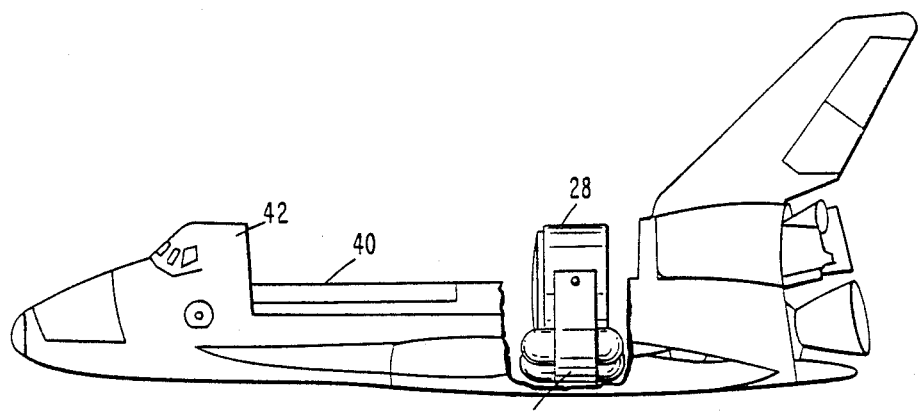
FIG. 3 is an elevated, partially fragmented side view of a space shuttle incorporating the preferred embodiment of FIGS. 1 and 2.

Referring to FIGS. 1 and 2, a preferred embodiment of an apparatus comprising the invention is shown. The apparatus comprises first, second, third and fourth external bipropellant tanks (20, 22, 24, 26), respectively, external to a spacecraft (28), for containing a fluid bipropellant for use by the spacecraft (28), and first, second, third and fourth integral spacecraft bipropellant tanks (30, 32, 34, 36), respectively, supported by spacecraft support structure (38) in a manner which will be understood by those possessing skill in the art, for receiving the fluid bipropellant from the respective external bipropellant tanks (20, 22, 24, 26). The spacecraft (28) and the external tanks are disposed within the cargo bay (40) of a space shuttle (42) as shown in FIG. 3.

The spacecraft (28) of this embodiment is secured within a generally U-shaped cradle (44) within the cargo bay (40), and the four external bipropellant tanks (20, 22, 24, 26) are secured within the cradle (44) during the launch of the spacecraft (28) and the fluid bipropellant from the earth to the relatively low gravity environment above the earth of a parking orbit.

Figure 4:
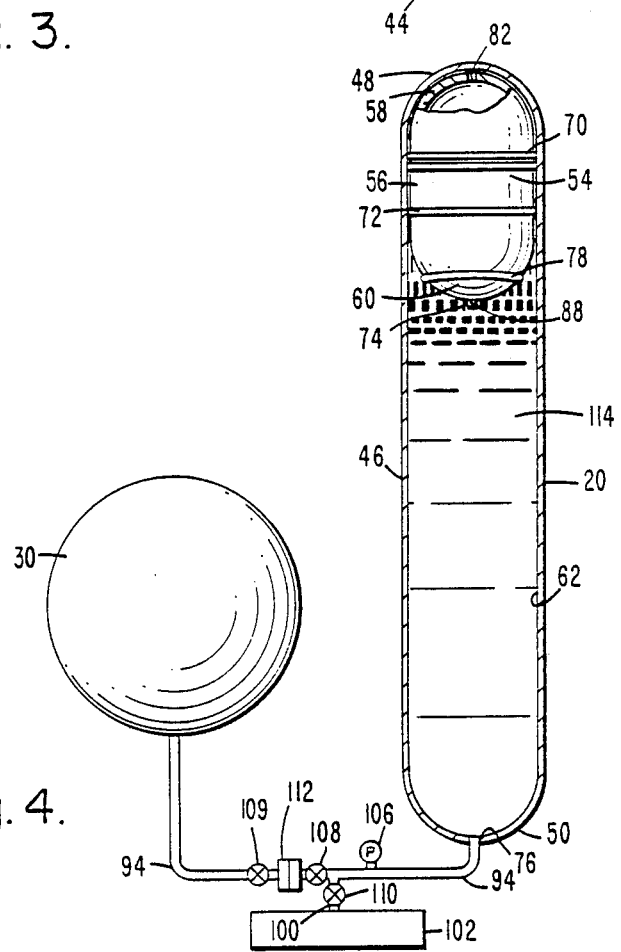
FIG. 4 is a diagramatic partially fragmented partial section view including an external tank and integral spacecraft tank of the preferred embodiment wherein a piston is disposed in a first position prior to bipropellant transfer.
Figure 5:
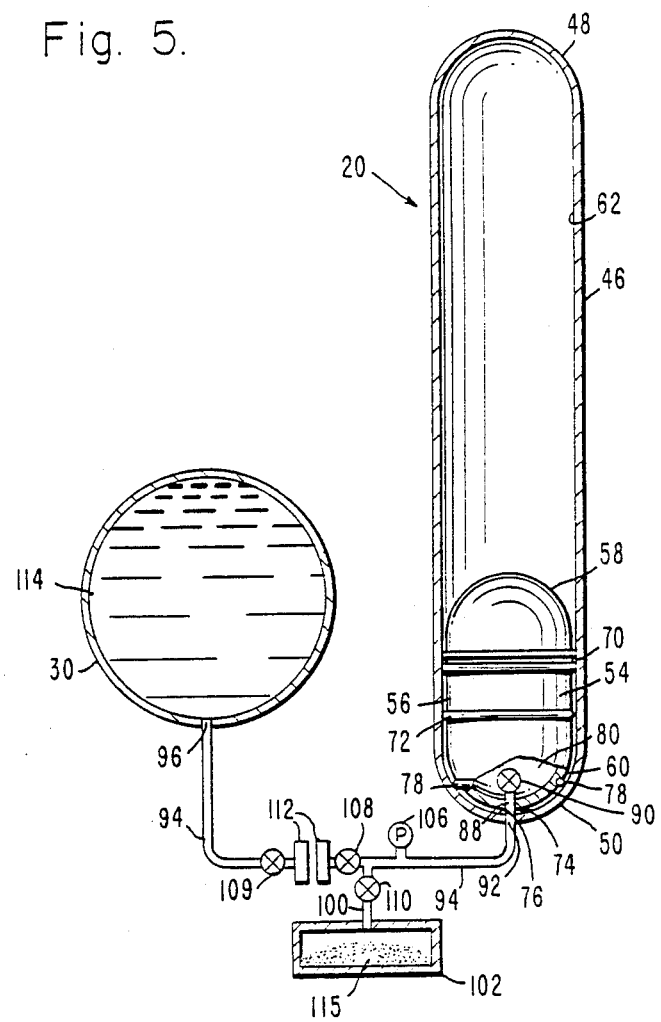
FIG. 5 is a diagramatic view as in FIG. 4 wherein the piston is in a second position after bipropellant transfer.

The four external bipropellant tanks (20, 22, 24, 26) are substantially identical as are the four integral spacecraft bipropellant tanks (30, 32, 34, 36). Thus, the exemplary drawings of the first external tank (20) and the first bipropellant spacecraft tank (30) in FIGS. 4 and 5 are representative of the remaining external and spacecraft tanks. The first external tank (20) comprises a generally elongated cylindrical central section (46) and first and second longitudinally spaced substantially hemispherical end closures (48, 50), respectively, for enclosing opposite ends of the central section (46). Referring once again to FIGS. 1 and 2, the external tanks (20, 22, 24, 26) are disposed about the U-shaped cradle (44) with their longitudinal axes aligned substantially parallel to one another and to the longitudinal axis of the U-shaped cradle (44).

The external bipropellant tanks (20, 22, 24, 26) are laterally disposed with respect to one another within the cradle (44) in a generally semi-annular arrangement about the cradle (44). First and second external bipropellant tanks (20, 22), respectively, are disposed adjacent to one another near the base of the U-shaped cradle, and third and fourth external bipropellant tanks (24,26), respectively, are disposed with the first and second tanks (20, 22), respectively, located substantially between them such that the first external tank (20) is between the second and third external tanks, (22, 24), respectively, and the second external tank (22) is between the first and fourth external tanks (20, 26), respectively. During the launch, the first and second external tanks (20, 22), respectively, contain the lighter propellant component, a fuel, and the third and fourth external tanks (24, 26), respectively, contain an oxidizer.

In the presently preferred embodiment, the four spacecraft bipropellant tanks (30, 32, 34, 36) supported by spacecraft support structure 38 each are substantially spherical in shape and are disposed about a central axis of the spacecraft; such that the centers of the four spherical tanks lie in a common plane; such that the center of each tank is separated by approximately 90°, relative to the spacecraft central axis, from the centers of the tanks adjacent to it; and such that the center of each tank is substantially equidistant from the spacecraft central axis. The four spacecraft bipropellant tanks (30, 32, 34, 36) may alternatively be of substantially coni-spherical shape for propellant expulsion efficiency. First and second spacecraft tanks (30, 32), respectively, are disposed with the spacecraft central axis between them, and third and fourth spacecraft tanks (34, 36), respectively, also are disposed with the spacecraft central axis between them.

After the spacecraft (28) and the fluid bipropellant have reached the parking orbit, the fuel is transferred from the respective first and second external tanks (20, 24) to the respective first and second spacecraft tanks (30, 32) and the oxidizer is transferred from the respective third and fourth external tanks (24, 26) to the respective third and fourth spacecraft tanks (34, 36) by means more fully described below.

One skilled in the art will appreciate that spacecraft support structure (38) (which forms no part of the present invention) used to support the spacecraft bipropellant tanks (30, 32, 34, 36) need not support fluid bipropellant during launch from the earth to the relatively low gravity environment above the earth. This is because during that portion of the spacecraft mission, the fluid bipropellant is contained within the cradle-mounted external tanks (20, 22, 24, 26). Thus, the support structure 38 used to support the spacecraft tanks (30, 32, 34, 36) and the fluid bipropellant transferred to those tanks generally need only be sturdy enough to withstand the relatively low forces exerted upon the spacecraft tanks (30, 32, 34, 36) and the bipropellant therein in the relatively low gravity environment above the earth such as acceleration loads generated by the spacecraft liquid propulsion motor (37). This can permit a reduction in the amount of spacecraft mass dedicated to support structure used to support the fluid bipropellant and a reduction in spacecraft complexity by obviating the need for the staging of certain spacecraft components.

Furthermore, one skilled in the art will appreciate that placing cylindrical external bipropellant tanks (20, 22, 24, 26) about the U-shaped cradle (44) in the manner described makes efficient use of the limited space within the cargo bay (40), and that placing the spacecraft tanks (30, 32, 34, 36) about the central axis of the spacecraft (28) in the manner described helps to ensure that the spacecraft bipropellant tanks (30, 32, 34, 36) and the fluid bipropellant transferred to those tanks are disposed about the spacecraft (28) in a balanced fashion such that the spacecraft (28) can rotate efficiently about its central axis after departing from the space shuttle (42).

The first external tank (20) as illustrated in FIGS. 4 and 5 substantially encloses a piston (54) slideably mounted therein to move substantially parallel to the longitudinal axis of the first external tank (20). The piston (54) comprises a cylindrical central section (56) and first and second substantially hemispherical piston end closures (58, 60), respectively, for enclosing opposite ends of the central section (56). The central section (56) of the piston (54) is diametrically sized to fit in snug slideable relation with interior walls (62) of an elongated cylindrical external tank central section (46) and is longitudinally sized to be significantly shorter than the central section (46) of the first external tank (20). The first and second substantially hemispherical piston end closures (58, 60), respectively, are diametrically sized to be complementary to the respective first and second hemispherical external tank end closures (48, 50), respectively, such that, when the piston (54) is in a first position, illustrated in FIG. 4, the first piston end closure (58) overlays a concave interior of the first external tank end closure (48), and when the piston (54) is in a second position, illustrated in FIG. 5, the convex second piston end closure (60) overlays a concave interior of the second external tank end closure (50).

The piston comprises a guide (70) such as a piston ring which cooperates with the interior walls (62) of the external tank central section (46) to permit substantially rattle-free movement of the piston (54) between the first and second positions. The piston also includes a sliding seal (72) such as a spring energized wiper which maintains the tight fit between the piston (54) and the interior walls (62) as the piston (54) moves between the first and second positions. The sliding seal (72) substantially prevents the flow of fluid bipropellant between the piston (54) and the interior walls (62). Furthermore, the piston (54) includes means for providing a tight seal between a region about the apex (74) of the second piston end closure (60) and the region about the nadir (76) of the concave interior of the second external tank end closure (68) when the piston (54) is in the second position. The means for providing a seal, for example, can be an O-ring (78) formed from a propellant compatable elastomer which encircles the apex (74) of the second piston end closure (60).

The piston (54) defines a chamber suitable for containing a pressurant gas such as helium. The first piston end closure (58) defines a first piston outlet port (82) from the chamber at an apex of the first piston end closure (58). The first piston outlet port (82) permits pressurant gas flow during propellant expulsion.

The second piston end closure (60) defines a second piston outlet port (88) at the apex (74) of the second piston end closure (60). A first valve (90) is provided for closing the second piston outlet port (88) when the piston (54) is in the first position and for opening the second piston outlet port (88) when the piston (54) is in the second position. The first valve (90), for example, can be a mechanically actuated relief valve.

The second external tank end closure (60) defines an external tank outlet port (92) which opens into a first conduit defined by a first pipe (94) for carrying fluid between the external tank outlet port (92) and an inlet port (96) defined by the first spherical tank (30). A second conduit defined by a second pipe (100) for carrying fluid branches from the first conduit. The second conduit opens into a residue container (102) defining a chamber for receiving residual fluid bipropellant from the first conduit.

A fluid pressure sensor (106) is provided to monitor the fluid pressure within the first pipe (94).

Second and third valves (108, 109), respectively, are provided for opening and closing the first conduit, and a fourth valve (110) is provided for opening and closing the second conduit. The second, third and fourth valves (108, 109, 110), respectively, are responsive to the fluid pressure sensor (106) in a manner which will be understood by a person skilled in the art.

A low spillage disconnect (112) is provided for disconnecting the first pipe (94) between the second and third valves (108, 109), respectively, at a location between the third valve (109) and the external tank outlet port (92). The disconnect (112), for example, can be a quick disconnect type, actuated by force and released by pressure. The disconnect (112) is diagramatically shown in a connected configuration in FIG. 4 and in a disconnected configuration in FIG. 5.

During the launch of the spacecraft (28) and the fluid bipropellant from the earth to the relatively low gravity environment above the earth, each external bipropellant tank (20, 22, 24, 26) contains a component (114) of the bipropellant, such as an oxidizer or a fuel. Referring to FIG. 4, the piston (54) is in the first position and the bipropellant component (114) is interposed between the second piston end closure (60) and the second external tank end closure (50). Meanwhile, the spacecraft tank (30) supported by the spacecraft support structure (38) is substantially evacuated. The piston (54) contains a pressurant gas such as helium. The pressure of the pressurant gas depends upon the particular needs of a launch, but a pressure of (100) pounds per square inch might be typical. The first, second, third and fourth valves (90, 108, 109, 110), respectively, are closed. Therefore, during the launch from the surface of the earth, the cradle (44) supports the external tank (20) and the bipropellant component (114) therein.

After the space shuttle (42) carrying the spacecraft (28) and the fluid bipropellant have reached a relatively low gravity environment above the earth, the bipropellant is transferred from the external bipropellant tanks (20, 22, 24, 26) to the spacecraft bipropellant tanks (30, 32, 34, 36). The transfer involves the step of opening the second and third valves (108, 109), respectively. Whereupon, the pressurant gas begins exiting through the first piston outlet port (82) and filling a region between the first piston end closure (58) and the first external tank end closure (48) driving the piston (54) from the first position, illustrated in FIG. 4, to the second position, illustrated in FIG. 5, and forcing the bipropellant component (114) through the external tank outlet port (92) through the first pipe (94) and through the inlet port (96) defined by the spacecraft tank (30).

The pressure sensor (106) measures the fluid pressure within the first pipe (94) as the bipropellant component (114) flows through the first pipe (94). As the second piston end closure (60) comes to rest with the O-ring (78) resting against an interior of the second external tank end closure (50), and substantially the last of the bipropellant component (114) exits from the external tank (20), the first valve (90) opens permitting pressurant gas to flow through the external tank outlet port (92) and into the first pipe (94). The pressure sensor (106) senses the drop of fluid flow as indicated by a drop of pressure in the first pipe (94) and causes the second and third valves (108, 109), respectively, to close the first conduit and causes the fourth valve (110) to open the second conduit. Thus, the relatively high pressure gas substantially flushes residual fluid bipropellant (115) from the first conduit through second conduit and into the residue container (102). Subsequently, the first and fourth valves (90, 110), respectively, are closed by means which will be understood by those skilled in the art.

A person skilled in the art will appreciate that, when the second piston end closure (60) comes to rest adjacent to the interior of the second external tank end closure (50), the interposition of the O-ring (78) results in a relatively tight seal between the two end closures which substantially prevents the piston (54) from moving longitudinally within the external tank (20).

The passage of pressurant gas through the first and second pipes (94, 100), respectively, as described, substantially flushes residual fluid bipropellant (115) from the pipes, and, therefore, reduces the danger that bipropellant will leak into the shuttle cargo bay (40) following disconnect of the first conduit. The provision of a low leakage disconnect (112) further reduces such danger.

Of course, the discussion above relative to the exemplary first external (20) tank and first spacecraft tank (30) applies equally to the remaining external tanks (22, 24, 26) and spacecraft tanks (32, 34, 36). Each external tank (20, 22, 24, 26) has an associated spacecraft tank (30, 32, 34, 36), respectively, to which it provides a bipropellant component. One will appreciate that this one-to-one relation between external tanks and spacecraft tanks simplifies the process of accurately distributing the fluid bipropellant components to the spacecraft tanks (20, 22, 24, 26). Accurate distribution is important since an improper balancing of the bipropellant mass about the central axis of the spacecraft (28) might prevent the spacecraft (28) from spinning properly about its central axis.

Thus, the apparatus and method of the present invention permit the use of a spacecraft (28) comprising fluid bipropellant support structure (38) suitable for supporting a fluid propellant in the relatively low gravity environment above the earth, but not necessarily as sturdy and massive as would be necessary to support the fluid bipropellant during the launch from actual surface of the earth. Therefore, a spacecraft (28) comprising reduced support structure mass can be provided. Such a spacecraft (28) might be less massive and, therefore, require less bipropellant for maneuvering and might obviate the need for staging certain spacecraft components to reduce spacecraft mass.

Furthermore, the apparatus and method of the present invention provide for fluid bipropellant transfer without significant spillage of the fluid bipropellant in the space shuttle cargo bay (40). This is an important factor because fluid bipropellant often can be hazardous to humans and to equipment.

It is understood that the number of external tanks need not be the same as the number of spacecraft tanks and that the external tanks need not include a piston for discharging a bipropellant constituent. Instead, a bladder comprising an outlet port which opens into the first conduit may be provided, and the pressurant gas introduced to the external tank might compress the bladder and force the propellant from the bladder and into a spacecraft tank. Alternatively, an external tank may include a bellows comprising an outlet port which opens into the first conduit, and contraction of the bellows might force the propellant from the bellows into a spacecraft tank. Alternatively, the shuttle may be rolled to provide for preferential propellant placement in the tanks (20, 22, 24, 26) and propellant expulsion by gas pressure only.

The invention, as described so far, has been demonstrated with respect to a spacecraft constructed without a separable booster rocket stage. However, as will now be demonstrated, the foregoing principle of transference of fuel from shuttle tanks to spacecraft tanks can be implemented also for a spacecraft having a staged propulsion system. The invention employs a separable rocket stage for delivery of the payload into a transfer orbit and then into a geosynchronous orbit.

In accordance with a major feature of the invention, the reduction in mass provided by the foregoing intertank fuel transfer allows for sufficient excess fuel to power the separated booster stage through a descent maneuver from the geosynchronous orbit that returns the booster stage to the shuttle parking orbit for recovery of the booster stage by the shuttle. The description of the invention continues now with the inclusion of the intertank fuel transfer system within a staged spacecraft, a showing of cost-wise efficient operation of a satellite mission with recovery of a booster rocket stage, and a description of suitable trajectories for launching a staged spacecraft from a shuttle in parking orbit to a geostationary orbit with recovery of the staged booster rocket stage.

Figure 6:
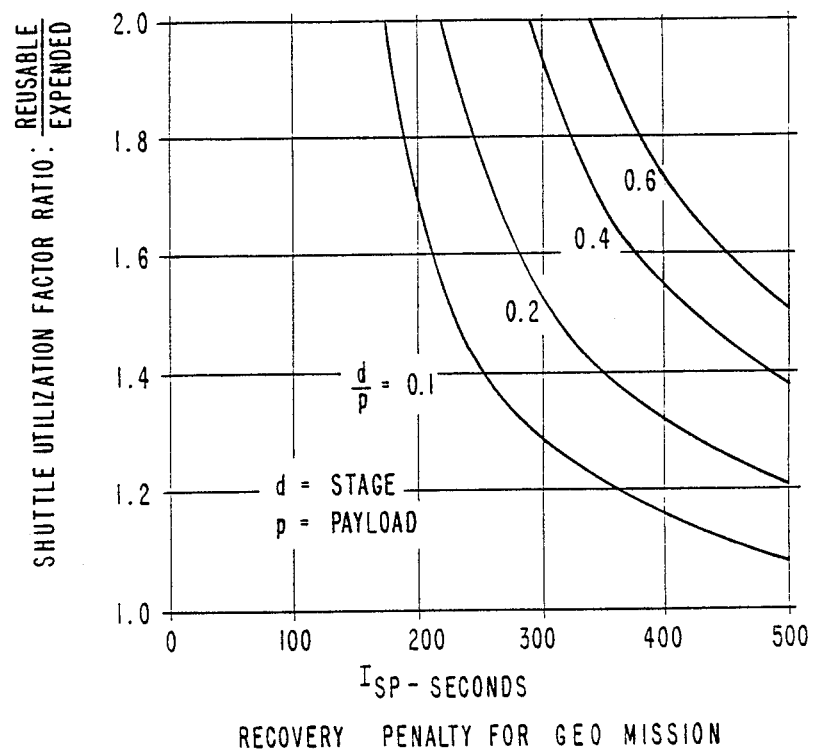
FIG. 6 is a graph showing relative shuttle utilization efficiency as a function of specific impulse of the engine of the booster stage.

FIG. 6 is useful in explaining an increase in shuttle cargo utilization factor, and the economic effectiveness of a recoverable separable stage from a spacecraft placed in a geostationary orbit from a shuttle parking orbit.

High energy orbits have been achieved by shuttle launched spacecraft using various types of upper stages or by integral propulsion (Leasat). The current upper stages are the PAM (payload assist module) and the IUS (inertial upper stage) for partial shuttle utilization; also, a Centaur derivative, if developed, would be useful for full shuttle utilization. These stages are not recovered after performing their function. It has been an object of the space shuttle program since its beginning to provide high energy orbit delivery with a recoverable upper stage. But such a stage, heretofore, has been impractical. The difficulty in this task is illustrated in FIG. 6 which shows, for a geostationary orbit insertion, an increase in the shuttle cargo utilization factor to provide for stage recovery. Such two-way mission is compared in FIG. 6 to a one-way mission for varying dry stage to payload mass fractions. This increase is due primarily to the additional fuel required for maneuvering the stage back to a shuttle orbit after the payload is released. The traces in the graph of FIG. 6 are plotted from mathematical expressions presented below:

$$M_1 = a(p+d) \qquad (1)$$

In the case of a two-way mission, $$M_2 = a(p+ad) \qquad (2)$$

Combining equations (1) and (2) provides $$(M_2)/(M_1) = [1 + a(d/p)]/[1 + (d/p)] \qquad (3)$$

wherein $$a = exp\ [(\Delta v)/(Isp)g] \qquad (4)$$

In the foregoing equations, $M_1$ and $M_2$ represent the separated cargo mass for a one way and a two way mission respectively, this being the entire mass of the spacecraft as launched from the shuttle including the weight of fuel. "p" is the payload mass, this being the mass of that portion of the spacecraft which is inserted into the geostationary orbit. "d" is the stage dry mass, this being the mass of the separable rocket booster stage, excluding the mass of fuel and any interstage structure which is discarded, but including all of the reusable components such as telemetry, controls, fuel tanks, and the engine. "$\Delta v$" is the velocity imparted to the payload in traveling from the shuttle orbit to the final orbit (the geostationary orbit in this example). "Isp" represents specific impulse and is numerically equal to the length of time that a pound of propellant can burn while producing a constant thrust of one pound. "g" is the standard gravitational acceleration (32 ft/sec/sec).

For the geostationary mission, used as an example in FIG. 6, "$\Delta v$" is taken as 14,100 ft/sec which amount takes into consideration an allowance of 200 ft/sec for reorientations and error corrections. The expression for "$\Delta v$" is approximately equal to the sum of 8,000 ft/sec increment in traveling from the shuttle to the apogee of the transfer orbit, plus 5,900 ft/sec increment in speed in progressing from the transfer orbit to the geostationary orbit, the latter being a circular orbit as distinguished from the transfer orbit which is elliptical. The velocity increment of 14,100 ft/sec is more than adequate for payload injection into a Mars or Venus interplanetary trajectory.

In order for the stage recovery to be economical, the cost of the increased shuttle utilization should be less than the cost of the stage. Although there is some uncertainty in the cost of both the shuttle and of the stage, it appears that the break-even ratio of $(M_2)/(M_1)$ is approximately 1.5, with a lower ratio showing a definite advantage for recovery. In a spacecraft incorporating the preferred embodiment of the invention, the present design achieves a ratio of approximately 1.25. This ratio is accomplished by a combination of a very low stage weight and a high performance pump-fed bipropellant engine for the major velocity increments. In particular, the bipropellant tank weight, which is approximately half of the stage weight, is only one percent of the bipropellant weight when on-orbit fueling is employed.

In order to accomplish the two-way mission in a short enough time to preclude an extension of the shuttle flight duration, it is desirable to add a well-known velocity meter (not shown) to a system (not shown) which controls the flight path of the spacecraft. The velocity meter, an integrating accelerometer which will be used to terminate thrust precisely when the desired velocity increment for a given maneuver is achieved, permits a more rapid accomplishment of the mission.

Figure 7:
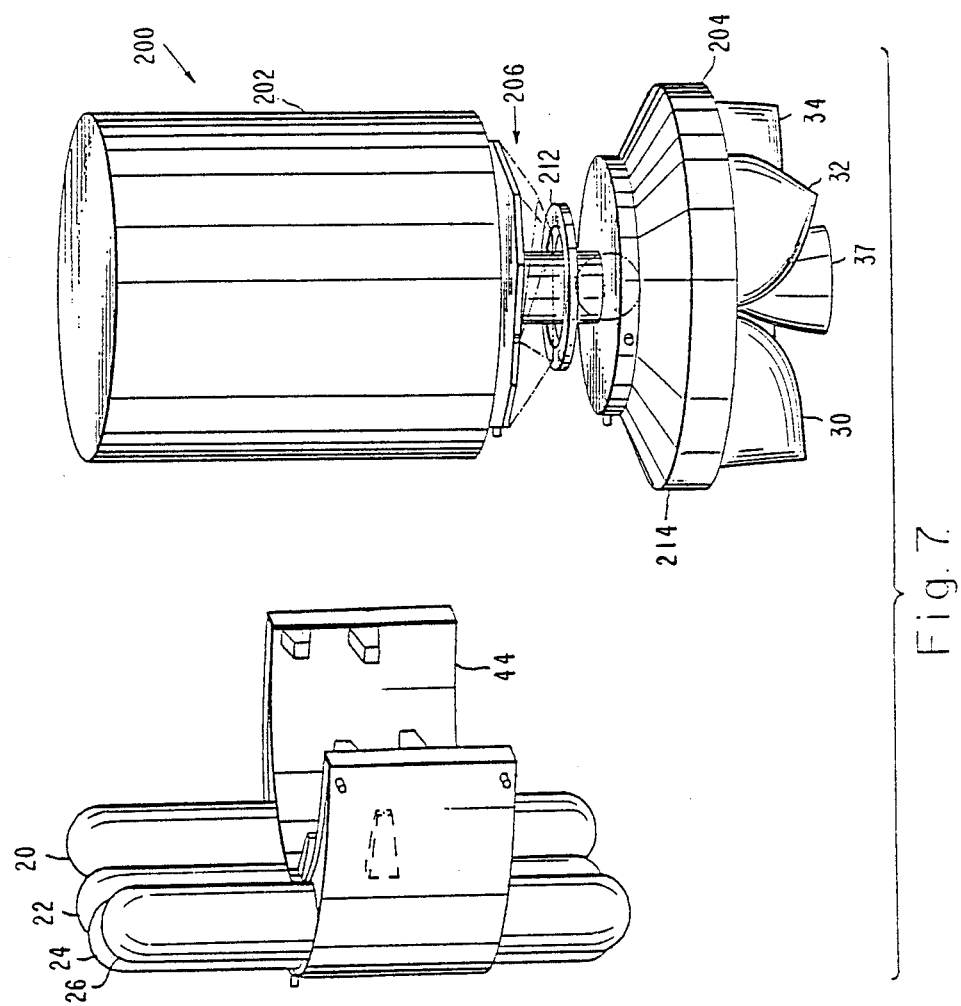
FIG. 7 is an elevation view, partially exploded, of the spacecraft and a cradle assembly in accordance with the invention.
Figure 8:
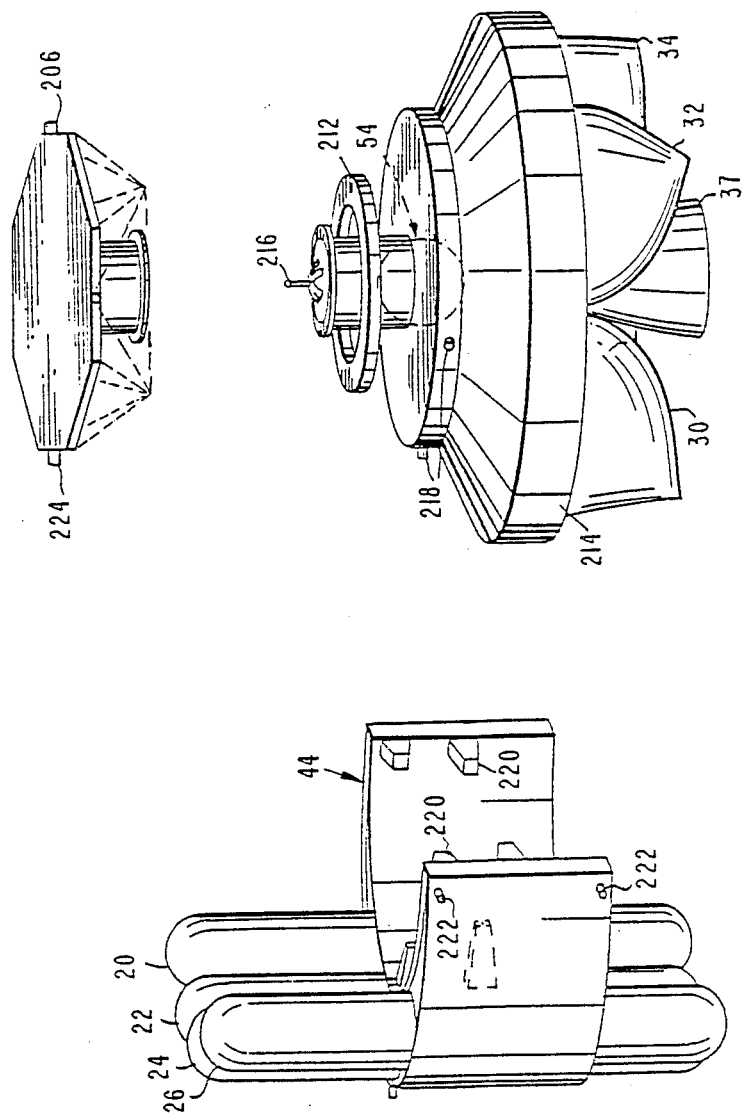
FIG. 8 is an exploded view of the booster stage, an interstage structure, and the cradle assembly of FIG. 7.
Figure 9:
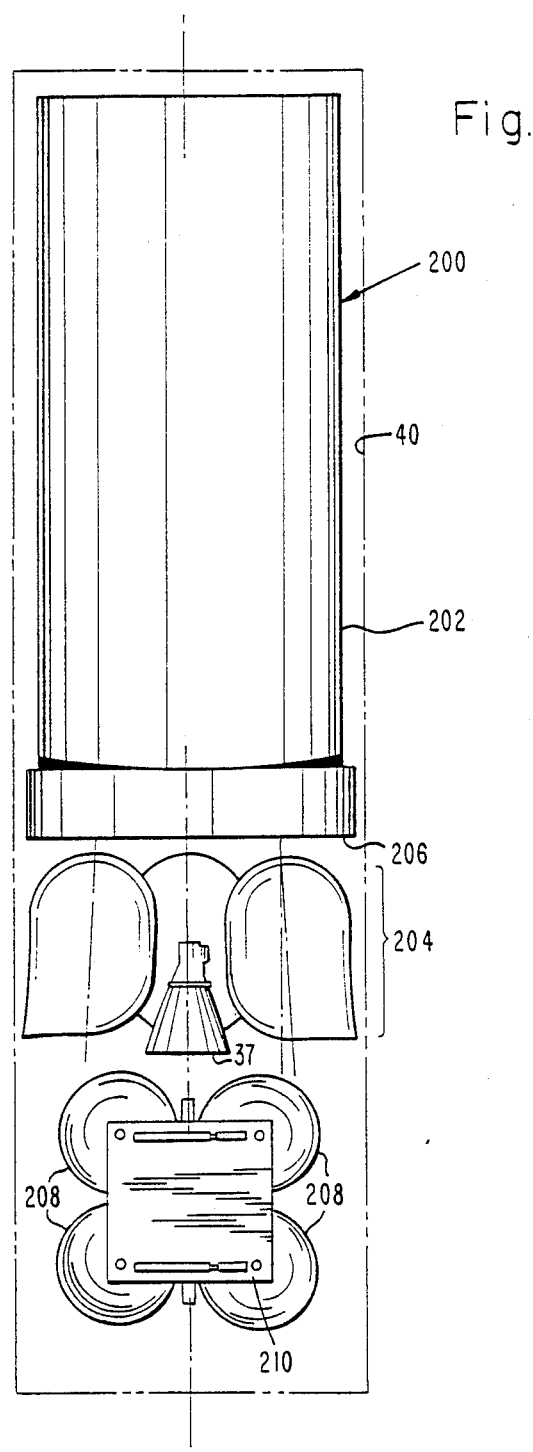
FIG. 9 shows a side view, in diagrammatic form, of a payload and recoverable booster stage of the spacecraft, the view also showing shuttle tanks for containing fuel.

With reference to FIGS. 7–8, a spacecraft (200) comprises a payload (202), a reusable engine stage (204), and an interstage structure (206) which connects the engine stage (204) to the payload (202). In accordance with the invention, the engine stage (204) includes a propulsion motor (37) fed by fuel from relatively lightweight tanks such as the tanks (30, 32, 34) and a fourth tank not visible in the views of FIGS. 7–8.

As will be described below, the interstage structure (206) allows for a disconnection of the engine stage (204) from the payload (202) after the spacecraft (200) is inserted into a geostationary orbit. The interstage structure (206) is discarded, and the engine stage (204) undergoes a descent maneuver which returns the engine stage (204) to a parking orbit of a space shuttle (42) for recovery and return to earth.

Figure 11:
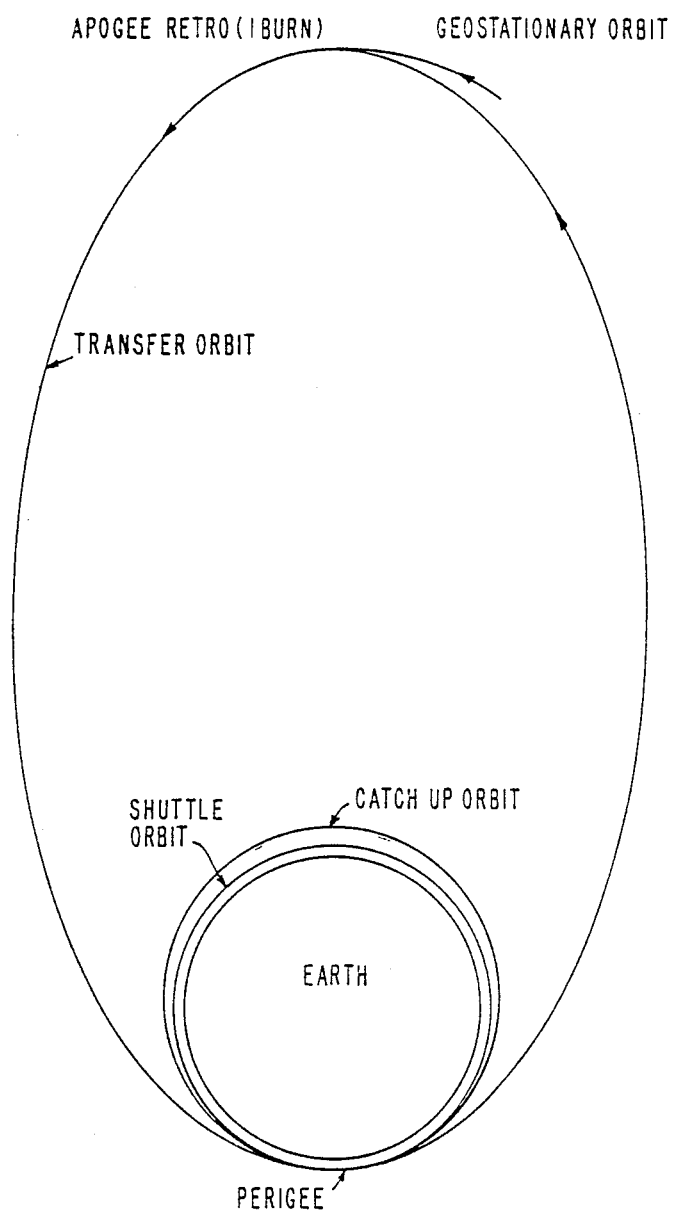
FIG. 11 shows a trajectory during a descent maneuver of the recoverable stage after separation from the payload in accordance with the method of the invention.

For large or Centaur sized payloads, placing the external bipropellant tanks in the cradle may not be feasible. In this situation, to provide full shuttle cargo capability utilization, the payload and a bipropellant tank module including four bipropellant tanks (208) may be arranged in line as illustrated in FIG. 11.

As shown in FIGS. 7–8, the engine stage (204) includes a telemetry and command antenna (212) and a solar panel (214) which converts solar energy into electrical energy for powering electrical circuitry (not shown) coupled from the antenna (212). The electrical circuitry also provides for command and control function relating to the operation of the propulsion motor (37). The antenna (212) is located at the end of the stage (204) opposite the engine (37) to allow communication between the payload (200) and stage (204) and the shuttle (42) and ground based tracking stations throughout the mission.

A grapple fixture (216) is located on the front of the stage (204) for well-known interaction with the shuttle remote manipulator system for recovery by the shuttle of the stage (204). Attachment fixtures (218) on the exterior of the stage (204), and further attachment fixtures (220) on the interior of the cradle (44) facilitate connection and disconnection of the stage (204) to the space shuttle (42). Further attachment fixtures (222) on the exterior of the cradle (44) are employed for securing the cradle (44) to the interior of the cargo bay (40). The interstage structure (206) is also provided with attachment fixtures (224) to aid in securing the spacecraft (200) to the cradle (44) within the space shuttle (42).

In operation, the spacecraft (200) is loaded on board a space shuttle and carried to a parking orbit above the earth. The spacecraft (200) is launched from the shuttle for insertion into the transfer orbit. The propulsion motor (37) burns propellant provided by the stage tanks (30, 32, 34, 36) to boost the spacecraft from the parking orbit into the transfer orbit and then the geostationary orbit. Thereupon, the interstage structure (206) is activated, in well-known fashion, by electronic signals of well-known electrical circuitry (not shown) carried by the engine stage (204) to disconnect the payload (202) from the stage (204). Subsequently, the interstage structure (206) is separated from the stage and discarded. The engine stage (204), which has become separated from the payload (202), is reactivated by signals from the foregoing electrical circuitry to maneuver into a descent trajectory which brings the engine stage (204) back to the parking orbit of the shuttle (42). The engine stage (204) is then recovered by the shuttle (42) to be returned to earth for future use in the launching of future payloads.

In the foregoing description of the operation, mention has been made of the maneuvering of the spacecraft (200), the payload (202), and the reusable engine stage (204) in various trajectories and orbits in order to accomplish the purposes of the invention. These trajectories and orbits will now be further described with reference to FIGS. 10–12.

Figure 10:
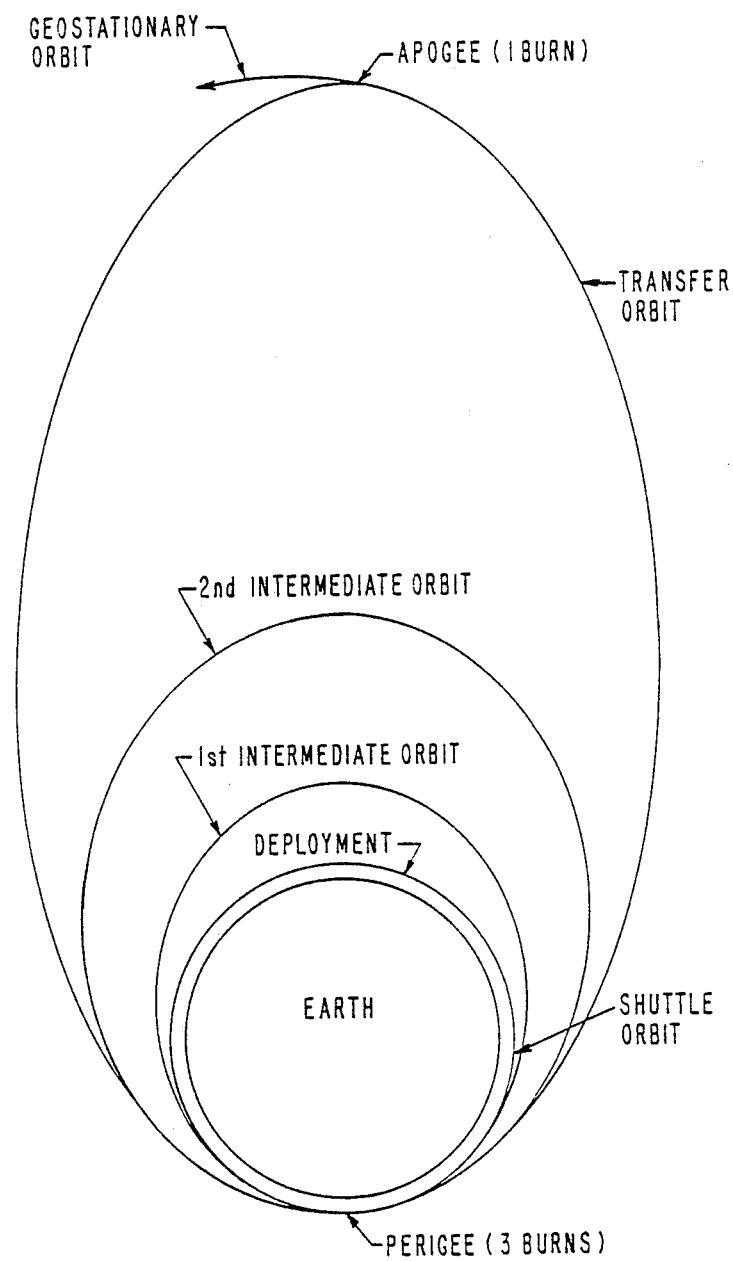
FIG. 10 shows a sequence of trajectories during ascent of the spacecraft to the geosynchronous orbit for accomplishing the method of the invention.

FIG. 10 illustrates typical orbit maneuvers required for injecting the payload (202) into a geostationary orbit. After ejection from the shuttle (42), the spacecraft (200) is rotated about its longitudinal axis providing a spin-up to approximately 15 RPM (revolutions per minute). There follows a half orbit (45 minutes) drift at the end of which the first burn of the main engine occurs, actuated by a timer (not shown) for imparting a velocity increment of 2300 ft/sec, the acceleration of the spacecraft to the foregoing velocity being terminated by a signal from a well-known velocity meter (not shown).

The new orbit has a period of about two hours. After one orbit, a second main engine burn is inaugurated by the timer at perigee and terminated by the velocity meter at 2900 ft/sec, this increasing the orbit period to three hours and forty minutes. After completion of one revolution in this new orbit, a third burn is initiated by command of the timer and has a velocity increment of 2800 ft/sec, this latter burn being terminated by the velocity meter. This third burn achieves the geostationary transfer orbit, which orbit has a ten hour and thirty-three minute period.

Reorientation for the apogee maneuver is accomplished by radio command during the first transfer orbit, and apogee firing start is commanded by radio command at the optimum time, namely, at a second apogee of the transfer orbit thereby propelling the spacecraft into the geostationary orbit. The apogee burn imparts a velocity increment of 5900 ft/sec to achieve the desired orbit. The total elapsed time from shuttle deployment is twenty two hours and fifteen minutes.

After propulsion of the spacecraft (200) from a transfer orbit to the geostationary orbit, the stage (204) with payload (202) attached may be despun and separated, and the stage (204) spun up again thereafter to about 15 RPM. The separation is accomplished in dual fashion wherein the payload (202) first separates from the interstage structure (206), the structure (206) then separating from the stage (204). The stage (204) is then prepared for its return voyage to the shuttle. The first step in the return voyage is to reorient the stage (204) approximately 15° in preparation for a descent maneuver commencing 13 hours after apogee injection. The timing is chosen to align the node of the stage (204) with that of the shuttle. In the descent maneuver from the geostationary orbit, shown in FIG. 11, a velocity increment of 5800 ft/sec is started by radio command and is terminated by the velocity meter.

The stage (204) is now in the ten hour and thirty-three minute transfer orbit with a perigee at the shuttle orbit altitude. The stage (204) is reoriented during this orbit via radio command and control in preparation for the application of the perigee velocity increment, which increment occurs at the perigee. The perigee burn is sized to create a new orbit of a slightly longer period than that of the shuttle, so that the shuttle can catch up with the stage (204).

The final maneuver is a synchronizing maneuver, performed by radio command. The entire mission up to the shuttle catch-up phase lasts about fifty-two hours, allowing twenty hours for touch-up mnaneuvers and despin during the catch-up to complete the recovery within three days of deployment.

The final stages of the rendezvous are completed by the shuttle crew, using first optical and then radar tracking to home in on the stage. When the stage is within range of a remote manipulating system (not shown) of the shuttle, an arm thereof is visually guided by an astronaut to attach itself to the stage (204) at the grapple fixture (216) thereof, and then return the stage (204) to the cargo bay of the shuttle. The foregoing description is typical of an exemplary geostationary orbit two-way mission. Other mission profiles, of course, are possible. Planetary missions may require variations in the procedure, for example, a fast reorientation after payload injection, but the equipment disclosed above will accomplish the requisite tasks for such planetary missions.

Figure 12:
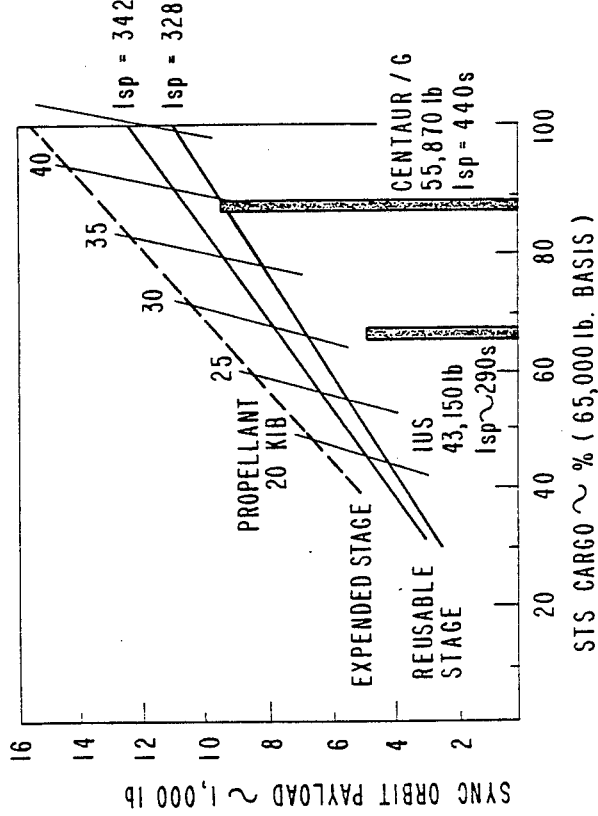
FIG. 12 shows performance of the recoverable stage compared to that of other rocket driven vehicles.

FIG. 12 shows the performance of the stage (204) for the geostatinary orbit, and compares this performance to that of the aforementioned IUS and Centaur. Because of their relativley light stage weight, the comparable reusable stage (204) delivers an IUS sized payload into geostationary orbit at a lower cargo mass than the IUS, and delivers a payload equal to the Centaur payload at the same cargo mass as the Centaur mission. Yet, in each case, the reusable stage is recovered. Also shown in FIG. 12 is the performance of the reusable stage used in a one-way mission, which may be desired in cases wherein a greater than Centaur G payload weight is required.

A significant feature of the present invention which enables efficient operation of spacecraft engines and, more particularly, the engine (37) of the separable booster stage (204) in a spacecraft so equipped, is the employment of the bipropellant delivery system which introduces adjustable pressures within the stage tanks (30, 32, 34, 36) to compensate for inaccuracies in bipropellant flow rates. Such inaccuracies develop because of variations in the vapor pressures and propellant pressure heads within the stage tanks (30, 32, 34, 36) during operation of the engine (37). The bipropellant delivery system of the invention provides a novel method for making pressure adjustments between engine burns in a sequence of such burns to insure efficient burning and the avoidance of excess bipropellant in the stage tanks (30, 32, 34, 36) at the end of a sequence of burns. Since the weight of such excess bipropellant militates against success of a spacecraft mission, this feature of the invention greatly enhances the chances of a successful mission. This feature will now be described with reference to FIGS. 13–14.

Figure 13:
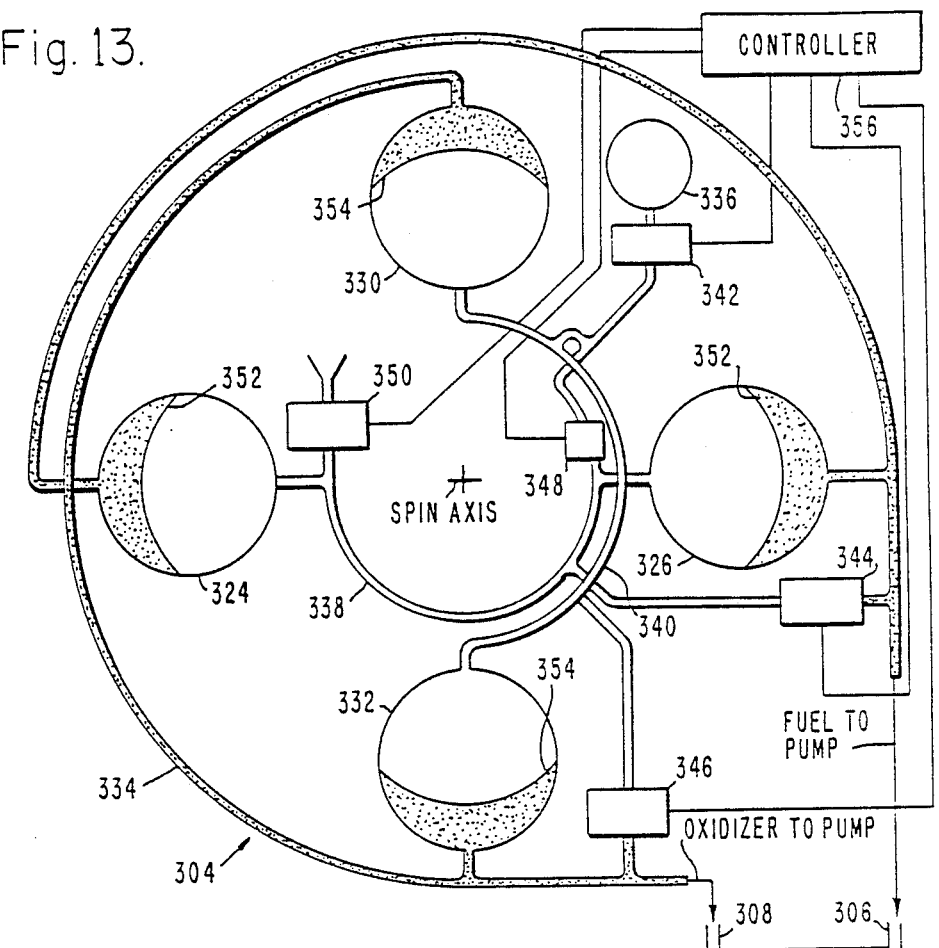
FIG. 13 is a diagrammatic view of a spacecraft engine and of the bipropellant delivery system of the invention for applying fuel and oxidizer to a spacecraft engine, the figure further showing tanks and controls of bipropellant utilization by a pressurant gas manifold and valves for regulation of the pressurant gas.
Figure 14:
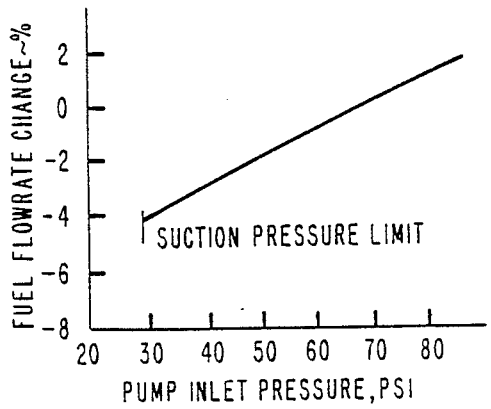
FIG. 14 is a graph showing dependency of fuel flow rates on inlet pressure from storage tanks to the pumps of FIG. 13.

FIG. 13 shows a propulsion system (300) incorporating the invention for driving a rocket stage of a spacecraft. The system (300), however, may also be used for driving a spacecraft which does not have staged engines. The system 300 includes a rocket engine (302) and a bipropellant delivery system (304) which supplies fuel and oxidizer via conduits (306, 308), respectively, to the engine (302). The fuel and oxidizer are the two constituents which make up the bipropellant. The engine (302) comprises a valve (310), pumps (312, 314) for pumping fuel and oxidizer, a turbine (316) which drives the pumps (312, 314), a gas generator (318) and a thrust chamber (320). Gas emitted by the generator (318) propels the turbine (316), and spent gases from the turbine (316) are conducted via an exhaust duct (322) to the mouth of the thrust chamber (320) for diposal of the spent gases. The thrust chamber (320) is cooled by the fuel applied by the pump (312) prior to the combination of the fuel and the oxidizer at the chamber (320). Upon combination of the fuel and the oxidizer, the fuel burns to provide the thrust which propels the spacecraft. Operation of the valve (310) and the pumps (312, 314) for establishing rates of flow for the fuel and the oxidizer is accomplished in a well-known fashion. In particular, these elements are operated by well-known timing circuitry (not shown) which initiate and terminate a burn of the engine (302) at prescribed instants of time so as to accomplish desired trajectories in a spacecraft mission.

The bipropellant delivery system (304) is constructed with symmetry about a spin axis of the spacecraft, and comprises two fuel tanks (324, 326) which are located opposite each other on a diameter passing through the spin axis. A liquid manifold (328) connects with the two tanks (324, 326) for conduction of liquid fuel therefrom to the conduit (306), and via the conduit (306) to the valve (310). The delivery system (304) further comprises two oxidizer tanks (330, 332) which are connected by a liquid manifold (334) for the conduction of liquid oxidizer to the conduit (308), and via the conduit (308) to the valve (310). The oxidizer tanks (330, 332) also are positioned opposite each other on a diameter passing through the spin axis.

Also included within the delivery system (304) is a pressurant gas tank (336), a gas manifold (338) for conducting pressurant gas to the fuel tanks (324, 326), and a gas manifold (340) for conducting pressurant gas to the oxidizer tanks (330, 332). A regulator (342) couples the pressurant gas tank (336) to the manifolds (338, 340). Two differential pressure sensors (344, 346) are provided between the respective liquid and gas manifolds for sensing the differential pressure between their respective two gas manifolds and two liquid manifolds. The sensor (344) connects between the manifold (328) and the gas manifold (338) which connect with the fuel tanks (324, 326). The sensor (346) connects between the liquid manifold (334) and the gas manifold (340) which are connected to the oxidizer tanks (330, 332).

Two valves (348, 350) are inserted into the gas manifold (338) for regulating gas pressure therein, the valve (348) serving as an inlet valve and the valve (350) serving as an exhaust valve. Opening of the valve (348) tends to increase pressure in the gas manifold (338), while an opening in the valve (350) tends to reduce pressure in the manifold (338). It is noted that the two pressurant gas manifolds (338, 340) are joined together at the outlet of the regulator (342). Thereby, operation of the valves (348, 350) permits different pressures to be maintained in the two pressurant gas manifolds (338, 340).

The fuel tanks (324, 326) are shown partially filled with fuel (352). Similarly, the oxidizer tanks (330, 332) are shown partially filled with oxidizer (354). Due to the spinning of the spacecraft, the fuel (352) and the oxidizer (354) are forced outwardly away from the spin axis. The regulator (342), the sensors (344, 346), and the valves (348, 350) are electrically connected to a controller (356) which applies signals to these elements for the regulation of the delivery of fuel and oxidizer as will be described hereinafter with reference to FIG. 15.

In operation, the engine (302) has the form of a turbopump-fed rocket engine employing a spinning propellant storage arrangement. The method of the invention assures that the fuel and the oxidizer are consumed in the correct proportions for simultaneous depletion of the stored fuel and oxidizer in their respective tanks. The invention employs measurements of the amount of fuel and oxidizer present between rocket engine burns in a multi-burn mission to adjust the relative flow rates between the fuel and the oxidizer for each succeeding burn as required to provide for the desired ratio in the utilization of the bipropellant constituents. This results in an increase in the effectiveness of the rocket engine, and is substantially easier to implement than a control of flow rates during an actual burn.

The oxidizer, typically nitrogen tetroxide, and fuel, typically mono-methyl hydrazine, are introduced into the pumps (314, 312) via the valve (310) at low pressure from the respective tanks (330, 332 and 324, 326). The oxidizer and fuel are pumped to a relatively high pressure by the pumps (314, 312), these pumps being driven by the turbine (316) in response to hot gas applied by the generator (318). The bipropellant (fuel and oxidizer) then are introduced into the thrust chamber (320) wherein combustion takes place. The fuel first flows through the outer walls of the chamber to cool the walls of the chamber and, thereafter, is burned in the presence of the oxidizer within the chamber (320) to produce the desired engine thrust.

The relative flow rates of the bipropellant constituents is determined primarily by the design of the pumps (312, 314), and upon the pressures in the tanks (324, 326, 330, 332). The dependence of fuel flow rate on pressure within the tanks (324, 326) is shown in the exemplary graph of FIG. 14. The dependence of fuel flow rate on tank pressure, as set forth in FIG. 6, is exploited in the present invention so as to adjust the fuel flow rate in accordance with the amounts of fuel and oxidizer remaining in their respective tanks upon the conclusion of each burn by the rocket engine (302).

In the operation of the delivery system (304), the system is pressurized by a gas, typically nitrogen or helium, stored at relatively high pressure in the tank (336), and delivered through the pressure regulator (342). This arrangement provides the desired bipropellant constituent tank pressure. The differential pressure sensors (344, 346), respectively for fuel and oxidizer element measurements, measure the amounts of the respective bipropellant constituents in their respective tanks. This permits computation of the masses of the fuel and oxidizer by the controller (356).

The pressure of the fuel can be adjusted by operation of the inlet valve (348) and the exhaust valve (350). The fuel pressure is lowered by shutting the inlet valve (348) and opening the exhaust valve (350); and the pressure is increased by opening the inlet valve (348) and closing the exhaust valve (350). The fuel flow rate is adjusted for the next burn by adjusting the fuel pressure between burns, the interval of time between burns typically is long enough for measurement of the amounts of fuel and oxidizer within the respective tanks and regulating the relative pressure within the respective tanks. The desired flow rate compensates for the ratio of the mass of the remaining oxidizer to the mass of the remaining fuel found at the conclusion of the previous burn in order to prevent surplus fuel or oxidizer after the final burn. It should be noted that slight variations in the mixture ratio of oxidizer and fuel will have negligible effect on the engine burn efficiency as compared to the payload mass delivery penalties incurred by not preventing surplus fuel or oxidizer after the final burn.

The calculations for correcting the rates of propellant utilization, and the calibration of the differential pressure sensors to achieve the high accuracy desired for a spacecraft mission can be done either aboard the spacecraft or stage carrying the rocket engine (302), or can be accomplished with groundbased computers employing telemetry and command for operation of the spacecraft.

The gas manifolds (338, 340) contact their respective tanks at sites facing the spin axis. The liquid manifolds (328, 334) contact their respective tanks at sites diametrically opposed to the points of connection of the tanks with the manifolds (338, 340). Due to the spinning of the spacecraft, the contents of the tanks, namely, the fuel (352) in the tanks (324, 326) and the oxidizer (354) in the tanks (330, 332), are directed outwardly towards the manifolds (328, 334) and away from the manifolds (338, 340). Thus, vapor within the partially filled tanks communicates with the gas of the gas manifolds (338, 340), while liquid contents of the tanks communicate with the liquid manifolds (328, 334). This configuration of the vapor and liquid matter within each of the tanks (324, 326, 330, 332) enables the pressurant gas of the tank (336) to provide a back pressure which urges the liquid fuel and liquid oxidizer towards their respective manifolds and into the engine (302).

The desired fuel flow rate for the next burn can be expressed as a set of three equations based on the following parameters:

$M_o$ is the initial oxidizer mass,
$M_f$ is the initial fuel mass,
$m_o$ is the last measured oxidizer mass,
$m_f$ is the last measured fuel mass,
$dm_o$ is the oxidizer mass to be used in the next burn, and
$dm_f$ is the fuel mass to be used in next burn.

The first equation gives the desired ratio R of oxidizer mass to fuel mass, namely:

$$\frac{m_o - dm_o}{m_f - dm_f} = \frac{M_o}{M_f} = R \tag{5}$$

Measurements of fuel and oxidizer actually consumed may indicate a deviation from the desired ratio, expressed as an error $\epsilon$ given by:

$$\epsilon = \frac{m_o}{m_f} - R \tag{6}$$

Compensation for the error is accomplished in the next burn by use of adjusted, or corrected flow rates which are described mathematically by substituting equation (6) into equation (5) to give:

$$R \, dm_f = dm_o - m_f \epsilon \tag{7}$$

Figure 15:
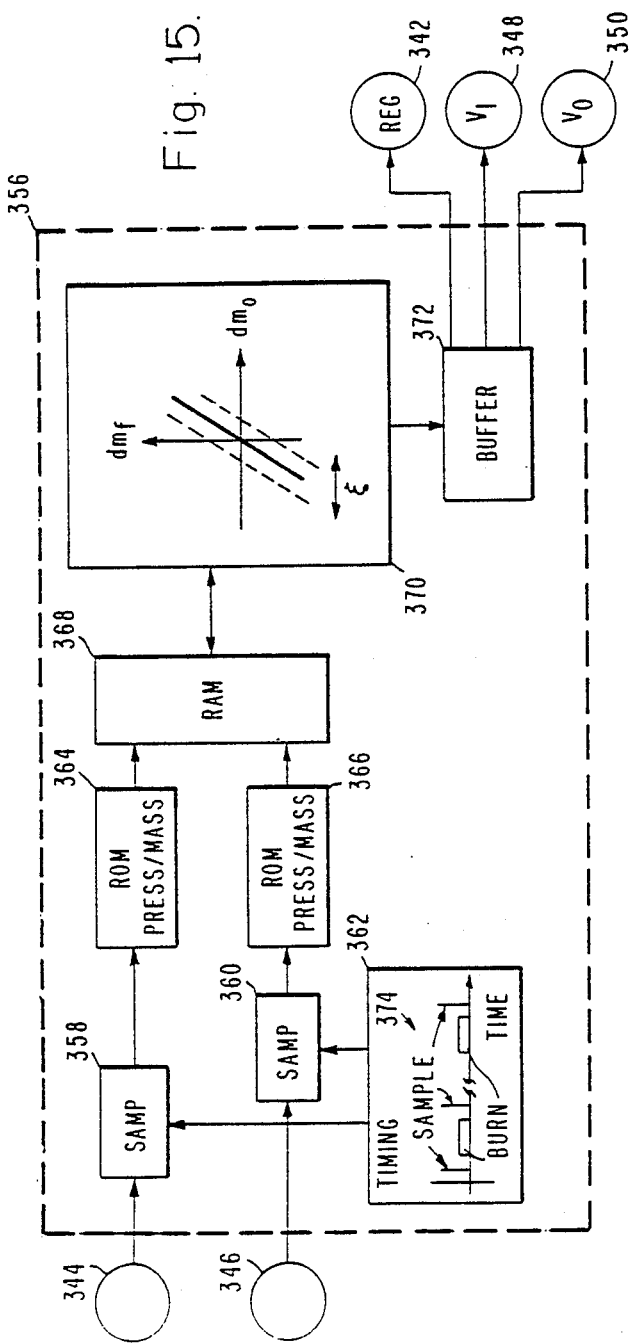
FIG. 15 is a block diagram of a controller of FIG. 13.

With reference also to FIG. 15, the controller (356) comprises two sampling units (358, 360), a timing unit (362), two memories (364, 366) which are constructed as read-only memories, a memory (368) constructed as a random-access memory, a computer (370), and an output buffer (372). The sampling unit (358) is connected to the differential fuel pressure sensor (344) for the measurement of fuel. The sampling unit (360) is coupled to the differential oxidizer pressure sensor (346) for the measurement of oxidizer. Both of the sampling units (358, 360) are strobed by timing signals of the timing unit (362).

As is shown by a graph (374), within the block of the timing unit (362), the sampling units (358, 360) are strobed after each burn of the rocket engine (302) (FIG. 13). The sampling units (358, 360) may also be strobed prior to the first burn to determine the initial quantities of fuel and oxidizer.

The sampling units (358, 360) output the differential pressure measurements to the memories (364, 366). There is a relationship between differential pressure and the mass of bipropellant constituent stored in a tank; this relationship depends in part on the shape of the tank. This relationship is established experimentally during the construction of the delivery system (304) and, thereafter, is stored in a corresponding one of the memories (364, 366). The relationship between pressure and mass for the fuel contained within the tanks (324, 326) is stored in the memory (364), and the relationship between pressure and mass for the oxidizer contained within the tanks (330, 332) is stored within the memory (366). The memories (364, 366) serve as converters for converting the measured pressure to the corresponding mass of fuel or oxidizer remaining in the respective tanks. The stored mass of fuel and the stored mass of oxidizer are provided by the memories (364, 366) to the memory (368) for use by the computer (370).

With reference also to the foregoing set of three equations (5), (6) and (7), it is noted that each of the parameters is expressed in terms of mass, this being either the mass of oxidizer or the mass of fuel. The values of mass of stored oxidizer and fuel, prior to a burn and subsequent to burn in a sequence of burns, are stored in the memory (368). The desired ratio of oxidizer mass to fuel mass may be inputted directly to the memory (368) by conventional means (not shown) or may be calculated by the computer (370) in accordance with equation (5) from the initial values of oxidizer mass and fuel mass. The error in the desired mass ratio is calculated by the computer (370) in accordance with equation (6). Finally, the relationship between oxidizer mass and fuel mass to be employed in the next burn is calculated by the computer (370) in accordance with equation (7).

The relationship expressed by equation (7) for oxidizer mass and fuel mass to be employed in the next burn is recognized as being linear, this relationship being depicted in a graph (376) presented within the block of the computer (370). The slope of the line in graph (376) is dependent on the desired ratio of oxidizer mass to fuel mass, while the line is displaced along the horizontal axis (oxidizer mass) by an amount dependent on the foregoing error. A suitable amount of oxidizer mass and fuel mass is readily determined from the foregoing relationship. The computer (370) then sends appropriate signals to the buffer (372) to command further openings and/or closings of the regulator (342), the inlet valve (348), and the outlet valve (350) to establish suitable back pressures in the tanks (324, 326, 330, 332) for correction of the flow rates of the fuel and the oxidizer to the engine (302). The buffer (372) may contain well-known storage units for storing the output values of the computer (370), and well-known line drivers for applying the command signals to the regulator (342), and the valves (348, 350). It is also noted that the opening and/or closing of regulators and valves for the control of pressure is employed in numerous industrial processes, and is sufficiently well-known so as not to require a detailed explanation herein. Thereby, the controller (356) operates the delivery system (304) to correct the flow rates of oxidizer and fuel in accordance with the invention for improved deployment of a spacecraft in its missions.

Figure 16:
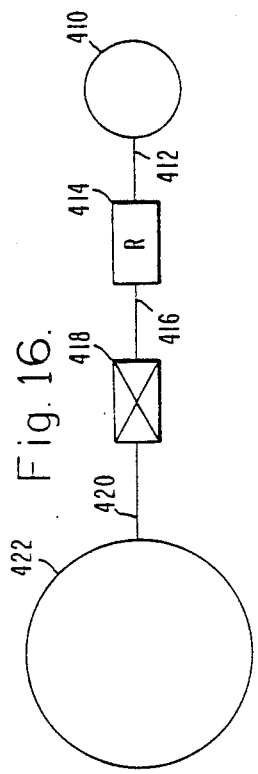
FIG. 16 is a diagrammatic view of an alternative system for pressurizing spacecraft bipropellant tanks.

Alternatively, pressure within the respective fuel tanks (324, 326) and the respective oxidizer tanks (330, 332) may be permitted to alternate between a substantially fixed regulated pressure and a variable blowdown pressure in order to achieve optimal bipropellant utilization. For example, as illustrated in FIG. 16, a source of high pressure pressurant gas (410), such as nitrogen or helium, may be provided which is pressurized at approximately 4000 psi. The pressurant gas (410) is provided on line (412) to a regulator (414) which regulates the gas pressure on line (416) to approximately 70 psi. Valve (418) is connected via line (420) to a bipropellant tank (422) containing one of the bipropellant constituents. The valve (418) is interposed between lines (416, 420) such that, when open, the pressure within the bipropellant tank (420) is maintained at 70 psi.

It will be appreciated that adjustment of the rate of utilization of a bipropellant constituent within the tank (422) can be achieved by selectively opening or closing the valve (418). For example, after an engine burn is accomplished with the valve (418) closed, the pressure within the tank (422) will be below 70 psi due to the discharge of some bipropellant constituent from the tank (422) during the burn. Thus, after that rocket engine burn and before a next burn, a measurement of bipropellant mass within the tank (422) is made. Based upon this measurement, it is determined whether optimum bipropellant utilization will be achieved by opening the valve (418) and repressurizing the tank (422) to 70 psi prior to the next engine burn or by performing the next engine burn in the blow-down mode in which the pressure within the tank (422) at the start of the engine burn is below 70 psi. It will be appreciated that adjustment of pressure within other bipropellant tanks (not shown) in a similar manner also can be performed between engine burns such that the relative pressures within bipropellant tanks containing oxidizer and bipropellant tanks containing fuel is optimized for optimum utilization of both bipropellant constituents. Furthermore, the determination of whether to adjust a bipropellant tank pressure to 70 psi or to operate in a blow-down mode during a subsequent burn can be determined in a manner similar to that described above with respect to FIG. 15.

It will be understood that the above-described embodiments and methods are merely illustrative of many possible specific embodiments and methods which can represent the principles of the invention. Numerous and varied other arrangements can readily be devised in accordance with these principles without departing from the spirit and scope of the invention. Thus, the foregoing description is not intended to limit the invention which is defined by the appended claims in which:

What is claimed is:

1. A method for launching a spacecraft including a payload and a delivery stage powered by fluid bipropellant, including first and second bipropellant constituents, from the earth into an orbit above the earth and for returning said delivery stage to the earth, said method comprising the steps of:

placing said spacecraft and said fluid bipropellant in a transport vehicle for carrying said spacecraft and said fluid bipropellant from the earth to a parking orbit above the earth, said first and second bipropellant constituents being placed in separate tanks in said transport vehicle disposed external to said spacecraft;

carrying said spacecraft and said external tanks containing said fluid bipropellant in said transport vehicle to said parking orbit above the earth;

transferring said first and second bipropellant constituents from said external tanks to tanks integral to said spacecraft for containing said first and second bipropellant constituents;

deploying said spacecraft from said transport vehicle into said parking orbit;

actuating a firing of a rocket engine in said delivery stage at least once to achieve an orbit by said spacecraft higher than said parking orbit;

separating said payload from said delivery stage following the delivery of said payload into the desired orbit;

actuating said rocket engine at least once after said separation step to return said delivery stage to a recovery orbit;

measuring the mass of each bipropellant constituent remaining following each firing of said rocket engine;

adjusting a gas pressure level in said integral tanks containing said first bipropellant constituent relative to a gas pressure level in the integral tanks containing said second bipropellant constituent following said measuring step to adjust the relative proportion of said first and second bipropellant constituents delivered to said rocket engine during the next firing of said rocket engine;

recovering said delivery stage with a recovery vehicle in said recovery orbit; and returning said recovery vehicle and said delivery stage to earth.

2. The method of claim 1 and further including the steps of:

sending remote guidance control signals from at least one remote station to provide precise timing information for beginning each of said rocket engine actuation steps;

sensing the velocity increment acquired by said delivery stage during each period of firing said rocket engine; and terminating said firing of said rocket engine based on the velocity increment sensed during said period of firing.

3. The method of claim 2 wherein said remote guidance control signals are sent from at least one ground based remote tracking station.

4. The method of claim 2 wherein an integrating accelerometer is used to sense said velocity increments.

5. The method of claim 1 wherein said first bipropellant constituent is a fuel and said second bipropellant constituent is an oxidizer.

6. The method of claim 1 and further including the step of separating an interstage structure positioned between said payload and said delivery stage from said delivery stage following said step of separating said payload from said delivery stage.

7. The method of claim 1 and further including the steps of:

providing spin to said spacecraft about a spacecraft spin axis following said step of deployment from said transport vehicle;

de-spinning said spacecraft prior to said step of separating said payload from said delivery stage;

providing spin to said delivery stage about a delivery stage spin axis following said step of separating said payload from said delivery stage; and de-spinning said delivery stage prior to said step of recovering said delivery stage with said recovery vehicle.

8. The method of claim 7 wherein said measuring step includes the step of detecting a pressure difference between said gas pressure level in each of said integral tanks and a point of each of said integral tanks farthest from said spin axis of said delivery stage and calculating the mass of each of said bipropellant constituents based on the spin rate of said delivery stage, the shape of said integral tanks and said detected pressure difference.

9. The method of claim 1 wherein said launch vehicle is also said recovery vehicle.

10. The method of claim 1 wherein said payload is delivered into a geosynchronous orbit and further including the steps of:

actuating said rocket engine three separate times at perigee of successive orbits of said spacecraft to achieve an ascent transfer orbit;

actuating said rocket engine at apogee of said ascent transfer orbit to achieve said geosynchronous orbit;

actuating said rocket engine following said step of separating said payload from said delivery stage to achieve a descent transfer orbit; and actuating said rocket engine at perigee of said descent transfer orbit to achieve a catch-up orbit having a period longer than the orbital period of said recovery vehicle to allow said recovery vehicle to rendezvous with said delivery stage.

11. A method for launching a spacecraft including a payload, an interstage structure and a delivery stage powered by fluid bipropellant including a fuel and an oxidizer from the earth into a geosynchronous orbit and for returning said delivery stage to the earth, said method comprising the steps of:

placing said spacecraft and said fluid bipropellant in a transport vehicle for carrying said spacecraft and said fluid bipropellant from the earth to a parking orbit above the earth, said fuel and oxidizer being placed in separate tanks in said transport vehicle disposed external to said spacecraft;

carrying said spacecraft and said external tanks containing said fluid bipropellant in said transport vehicle to said parking orbit;

transferring said fuel and said oxidizer from said external tanks to tanks integral to said spacecraft for containing said fuel and said oxidizer;

deploying said spacecraft from said transport vehicle into said parking orbit;

providing spin to said spacecraft about a spacecraft spin axis;

actuating a firing of a rocket engine in said delivery stage to boost said spacecraft into a first intermediate orbit, said actuation being controlled by signals from a remote ground tracking station;

sensing the velocity change of said spacecraft during each firing step using an integrating accelerometer;

terminating each firing of said rocket engine based on the sensed velocity change;

measuring the mass of the remaining portions of said fuel and said oxidizer following each firing of said rocket engine;

adjusting a gas pressure level in said integral tanks containing said fuel relative to a gas pressure level in said integral tanks containing said oxidizer following each measuring step to adjust the relative proportion of said fuel and said oxidizer delivered to said rocket engine during the next firing of said rocket engine;

actuating said rocket engine at perigee of said first intermediate orbit to boost said spacecraft into a second intermediate orbit;

actuating said rocket engine at perigee of said second intermediate orbit to boost said spacecraft into an ascent transfer orbit;

actuating said rocket engine at apogee of said ascent transfer orbit to boost said spacecraft into said geosynchronous orbit;

de-spinning said spacecraft;

separating said payload from said delivery stage;

providing spin to said delivery stage about a delivery stage spin axis;

actuating said rocket engine to drop said delivery stage into a descent transfer orbit;

actuating said rocket engine at perigee of said descent transfer orbit to drop said delivery stage into a catch-up orbit having a period longer than the period of said transport vehicle;

de-spinning said delivery stage;

recovering said delivery stage into said transport vehicle; and returning said delivery stage in said transport vehicle to the earth.

12. The method of claim 11 wherein said step of measuring the mass of the remaining portions of said fuel and said oxidizer includes the step of detecting a pressure difference between said gas pressure level in each of said integral tanks containing said fuel and said oxidizer and a point of each of said integral tanks containing said fuel and said oxidizer, respectively, farthest away from said delivery stage spin axis and calculating the mass of said fuel and said oxidizer based on the spin rate of said delivery stage and said detected pressure differences.

13. An apparatus for launching a spacecraft including a payload and a delivery stage powered by fluid bipropellant including first and second bipropellant constituents from the earth into an orbit above the earth and for returning said delivery stage to the earth comprising:

a transport vehicle for carrying said spacecraft and said fluid bipropellant from the earth to a parking orbit;

a plurality of tanks positioned within said transport vehicle external to said spacecraft for containing said first and second bipropellant constinuents during transport of said fluid bipropellant to said parking orbit;

a plurality of tanks integral to said spacecraft for receiving said first and second bipropellant constinuents from said external tanks;

means positioned in said transport vehicle for supporting said spacecraft and said external tanks;

means for transferring said fluid bipropellant from said external tanks to said integral tanks;

means for deploying said spacecraft from said transport vehicle;

said delivery stage including a rocket engine for burning said fluid bipropellant to provide thrust;

means for controlling the actuation of a plurality of firing steps of said rocket engine;

means for measuring the mass of each bipropellant constituent remaining after each firing of said rocket engine;

means for adjusting the proportion of bipropellant constituents flowing to said rocket engine prior to each firing of said rocket engine based on the measured mass of said first and second bipropellant constituents remaining after each firing of said rocket engine;

means for measuring the velocity increment imparted to said delivery stage by each firing of said rocket engine;

means for terminating each firing of said rocket engine based on the measured velocity increment of said delivery stage;

means for separating said payload from said delivery stage; and means in said transport vehicle for recapturing said delivery stage;

whereby said delivery stage delivers said payload from said parking orbit to a desired orbit above said parking orbit and is returned to the earth for reuse.

14. The apparatus of claim 13 wherein said means for separating said payload from said delivery stage comprises an interstage structure, said interstage structure being positioned between said payload and said delivery stage and being separable from said delivery stage following separation of said payload.

15. The apparatus of claim 13 wherein said first and second bipropellant constituents are fuel and oxidizer, respectively.

16. The apparatus of claim 13 wherein said external tanks include two fuel tanks and two oxidizer tanks and said integral tanks include two fuel tanks and two oxidizer tanks positioned symmetrically about a spin axis of said spacecraft, each of said integral tanks being adapted to receive fluid bipropellant from a corresponding external tank.

17. The apparatus of claim 13 wherein said control means comprises at least one remote ground based tracking station.

18. The apparatus of claim 13 wherein said velocity measuring means comprises an integrating accelerometer.

19. The apparatus of claim 13 wherein said means for adjusting the proportion of bipropellant constituents flowing to said rocket engine comprises means for adjusting the gas pressure level in said integral tanks containing said first bipropellant constituent relative to the gas pressure level in said integral tanks containing said second bipropellant constituent.

* * * * *